United States Patent [19]

Hall et al.

[11] 3,870,783

[45] Mar. 11, 1975

[54] PROCESS OF PREPARING SODIUM CARBONATE PEROXIDE

[75] Inventors: Richard E. Hall, Trenton; Sushil K. Bhalla, Cranbury, both of N.J.

[73] Assignee: FMC Corporation, New York, N.Y.

[22] Filed: Sept. 13, 1972

[21] Appl. No.: 288,658

[52] U.S. Cl. .............................................. 423/415
[51] Int. Cl. ............................................ C01b 15/10
[58] Field of Search ........ 423/415, 419, 421, 415 P; 252/186

[56] References Cited
UNITED STATES PATENTS

| | | | |
|---|---|---|---|
| 2,380,620 | 7/1945 | Walters | 423/415 |
| 2,541,733 | 2/1951 | Young | 423/421 X |
| 2,986,448 | 5/1961 | Gates et al. | 423/421 X |
| 3,463,618 | 8/1969 | Harris et al. | 423/421 |
| 3,677,697 | 7/1972 | Yanush | 423/415 |

FOREIGN PATENTS OR APPLICATIONS

| | | | |
|---|---|---|---|
| 122,277 | 9/1946 | Australia | 423/415 |
| 902,252 | 12/1953 | Germany | 423/415 |
| 1,191,571 | 5/1970 | Great Britain | 423/415 |

OTHER PUBLICATIONS

Riegel, E. R., Industrial Chemistry, Reinhold Publishing Company, N.Y., N.Y., 1949, pp. 252 & 262.

*Primary Examiner*—O. R. Vertiz
*Assistant Examiner*—Gary P. Straub

[57] ABSTRACT

A continuous process of producing sodium carbonate peroxide for use in laundry compositions by introducing separate streams of 50–70% hydrogen peroxide and saturated sodium carbonate solution into a crystallization zone at a pH of 11.5 at about 30°C for about 8 hours. The reactants are added in essentially 3:2 molar proportions. Before use, sodium carbonate is freed of iron and heavy metal contaminants by treatment with magnesium oxide. The reaction is carried out at in the presence of magnesium silicate stabilizer. After separating the product by centrifugation, the mother liquor is concentrated by removal of water by evaporation under vacuum. Fresh charge materials are added to maintain a steady state system.

7 Claims, 1 Drawing Figure

SCHEMATIC DIAGRAM OF SODIUM CARBONATE PEROXIDE CRYSTALLIZER

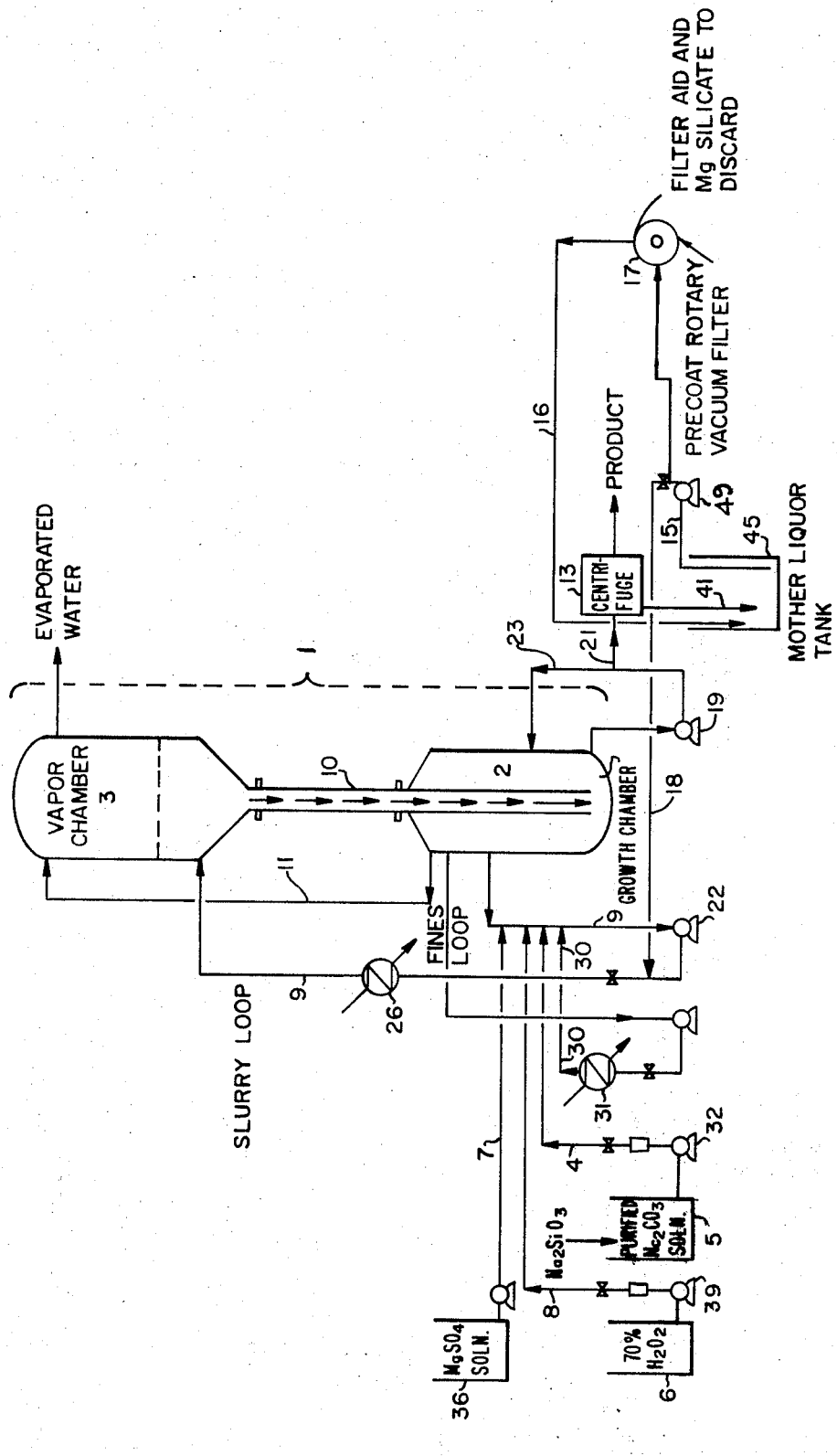

PROCESS OF PREPARING SODIUM CARBONATE PEROXIDE

This invention relates to the production of sodium carbonate peroxide. It is particularly concerned with improvements in a continuous crystallization process of manufacturing sodium peroxide.

Sodium carbonate peroxide is a known compound having a formula $2Na_2CO_3.3H_2O_2$ and is obtained by reacting stoichiometric quantities of sodium carbonate and hydrogen peroxide. It is a chemical complex in which the hydrogen peroxide is thought to be associated with the sodium carbonate in much the same manner as water of crystallization is bound in hydrated salts. When placed in aqueous media, sodium carbonate peroxide breaks down into its components, i.e. hydrogen peroxide and sodium carbonate. The salt thus acts as a carrier and source of hydrogen peroxide in a convenient dry form.

In the past few years considerable interest has arisen over the use of sodium carbonate peroxide as a bleaching agent in detergent compositions to replace sodium perborate which is environmentally objectionable. Sodium carbonate peroxide is not only an effective laundry bleach, but its decomposition products, sodium carbonate, water and oxygen, do not have a serious impact on the biosphere. Much of the recent work with sodium carbonate peroxide has focused on improved methods of production.

Most of the early methods of producing sodium carbonate peroxide reacted sodium carbonate and hydrogen peroxide in the presence of a stabilizer in a solution containing common salt and sodium bicarbonate in a batch process. Generally, temperatures were in the range of 0–5°C. The peroxide salt was obtained in the form of a slurry which was then separated, usually by filtration, from the solution. An improvement in the stability of sodium carbonate solutions was achieved using a process described in German Pat. No. 902,252 in which the reaction of peroxide and sodium carbonate was carried out at elevated pH levels using caustic alkali. The pH of the sodium carbonate-hydrogen peroxide aqueous system is normally about 10.5. Raising the pH to around 11 with caustic alkali as advocated in the German patent improved stability of the resulting sodium carbonate peroxide as manifested in more stable solutions of the compound. However, this process when operated continuously results in a hydrogen peroxide efficiency of only about 65% at 30°C. This is much too low for operation on a commercial scale.

A more recent improvement in the production of sodium carbonate peroxide is described in U.S. Pat. No. 2,986,448. According to this document, there is provided a process for the production of sodium carbonate peroxide by reacting, in a crystallization zone, an aqueous mixture containing hydrogen peroxide and sodium carbonate at a temperature not above about 5°C. After a reaction period of at least four hours, there is formed a slurry of sodium carbonate peroxide crystals which is removed from the crystallization zone, filtered and then dried to produce the final sodium carbonate peroxide product. The mother liquor containing dissolved sodium carbonate peroxide from the filtration is subjected to rapid flash evaporation under such conditions that excess water is removed from the system and the mixture of mother liquor and small crystals formed by evaporation is recycled to the crystallization zone.

Although the process of the U.S. patent is generally satisfactory, it is objectionable in that the crystallizer/reactor vessel requires external cooling. This necessitates the use of heat exchangers which add considerably to plant design costs and to operating overhead. Moreover, production of magnesium silicate by the reaction of sodium silicate with about 0.5 to 1.5% $MgCl_2.6H_2O$ based on weight of sodium carbonate peroxide results in the formation of such large amounts of magnesium silicate that it causes excessive nucleation resulting in a large proportion of very fine crystals. This in admixture with the voluminous gelatinous magnesium silicate results in a slurry that is exceedingly difficult to filter, at least on a plant scale.

And nowhere does the prior art provide a satisfactory answer to reducing the high hydrogen peroxide concentrations in the mother liquors due to the high solubility of sodium carbonate peroxide. This problem must be recognized and overcome if successful commercial production of sodium carbonate peroxide is to be achieved. Since sodium carbonate peroxide in solution reverts to hydrogen peroxide and sodium carbonate and since concentrated alkaline solutions of hydrogen peroxide are unstable, rapid and complete precipitation of solid crystalline sodium carbonate is essential to minimize hydrogen peroxide losses. Desirably the mother liquor should contain no more than about 2% hydrogen peroxide.

The most commonly practiced means of maximizing the precipitation of sodium carbonate peroxide is to salt it out by the addition of a soluble inorganic salt such as sodium chloride. This approach is illustrated in the aforesaid German Pat. No. 902,252. Manifestly, this practice is not satisfactory since it requires the addition of another component to the crystallizer thereby adulterating the sodium carbonate peroxide product. Moreover, sodium chloride solutions are corrosive to many materials so that its use often entails the use of more exotic and expensive materials for plant construction. The experiment of a salting out component clearly is most undesirable in the commercial production of sodium carbonate peroxide.

In many instances the prior processes make no provision for minimizing hydrogen peroxide losses. For instance, in the previously discussed U.S. Pat. No. 2,986,448, simple calculation reveals that the mother liquors contain over 8% hydrogen peroxide. When mother liquors containing such high percentages of hydrogen peroxide are concentrated for recycle use by evaporating water, the hydrogen peroxide losses are severe.

It has now been discovered that the aforeenumerated drawbacks attendant the prior art processes for manufacturing sodium carbonate peroxide can be overcome and excellent yields of high quality product obtained in a continuous process wherein aqueous solutions of hydrogen peroxide and sodium carbonate are reacted in stoichiometric amounts in a crystallization zone by operating in the region of the phase diagram wherein the hydrogen peroxide concentration is about 1.5 to 4.0% or 17 to 50 g per l, preferably about 2% and the sodium carbonate solution is about 12 to 20% or from about 150 g to 250 g per l, preferably about 18% making for a molar ratio of hydrogen peroxide to sodium carbonate from about 0.2 to about 0.7 at a pH of about 11.2 to about 11.7 at a temperature of from about 25°C to about 34°C at a residence time of about 5 hours to about 15 hours in the presence of about 10 to 70 ppm Mg as magnesium silicate from the reaction of soluble magnesium salt and sodium silicate, removing the so-formed crystalline slurry of sodium carbonate peroxide from the crystallization zone, filtering the slurry, drying the sodium carbonate peroxide product and returning the mother liquor to the crystallizer and evaporating under vacuum excess water from the system while continuously introducing fresh hydrogen peroxide and sodium carbonate solution. The elevated pH and small amounts of a soluble magnesium salt and sodium silicate and a low molar ratio of hydrogen peroxide to sodium carbonate combine to minimize hydrogen peroxide losses thereby permitting operation at essentially room temperatures or above and thus eliminating the need for external cooling and without causing excessive nucleation and generation of gelatinous magnesium silicate.

In carrying out the process of the invention, hydrogen peroxide and sodium carbonate are reacted in an essentially 3:2 molar ratio. The hydrogen peroxide is introduced directly into the crystallization zone in the form of an aqueous solution containing 50 to 70% by weight of hydrogen peroxide. The sodium carbonate is preferably added as a saturated aqueous solution, previously purified by treatment with a soluble magnesium salt or magnesium oxide to precipitate iron and other heavy metal contaminants.

Concentrated solutions of the reactants are desirable since less water needs to be evaporated.

The temperature in the crystallizer/reactor is maintained in the range of 25°C to 34°C preferably 30°C.

The residence time may be defined as the total weight of the solids in the crystallizer divided by the production rate per unit time. The crystallizer should be operated at a residence time of 2 to 8 hours preferably 6 hours. Residence time below 2 hours is limited by evaporation capability and residence time above 8 hours will result in excessive losses of hydrogen peroxide per pound of product.

To the sodium carbonate feed solution is added a solution of sodium silicate as stabilizer. The concentration of sodium silicate varies from about 0.005 g to 0.5 g, preferably 0.13 g per l of sodium carbonate solution. The ratio of $SiO_2/Na_2O$ in the sodium silicate varies from about 3.2:1 to 1:1, preferably 2:1. The sodium silicate is believed to react with the $Mg^{++}$ in the crystallizer to form magnesium silicate in situ which is the actual stabilizing entity for the sodium carbonate peroxide.

Any soluble magnesium salt can be used as a source of Mg. The salt is introduced into the crystallizer/ reactor in a separate stream of water. The rate of addition is 0.00003 to 0.0003 g of Mg for each g of sodium carbonate. The preferred salt is magnesium sulfate and the preferred concentration is 0.00009 g of Mg per g of sodium carbonate. Desirably the magnesium salt is added to the sodium carbonate feed solution in an amount whereby the Mg as Magnesium silicate in the crystallizer is maintained at about 10–70 ppm. The use of such minute quantities of Mg results in minimal production of magnesium silicate stabilizer wth concomitant reduction in nucleation and formation of undesirable fine crystals and gelatinous magnesium silicate.

The single FIGURE drawing shows a flow sheet of one embodiment of the process of the invention carried out in continuous manner.

In the drawing, 1 refers to a classifying crystallizer which includes a lower chamber 2 which is connected to an evaporation chamber 3 by downcommer 10. Chambers 2 and 3 are connected by equalizing line 11. Purified sodium carbonate solution, preferably nearly saturated, is conveyed by pump 32 from supply tank 5 via feed line 4 to slurry loop 9 and then into evaporation chamber 3. A solution of soluble magnesium salt, preferably $MgSO_4.7H_2O$ is introduced into slurry loop 9 from tank 36 via line 7. The amount of magnesium salt is adjusted whereby the concentration of Mg in the crystallizer is maintained at about 10 to 70 ppm Mg as magnesium silicate. Hydrogen peroxide is conveyed by pump 39 from supply tank 6 through feed line 8 to slurry return loop 9 and thence to evaporation chamber 3. Sodium carbonate containing sodium silicate and hydrogen peroxide react in crystallizer 1 to give about 85% of the total sodium carbonate peroxide crystals while the remaining 15% is obtained by evaporation in vapor chamber 3. The slurry from vapor chamber 3 enters lower chamber 2 through the downcommer 10 and passes out through the bottom of lower chamber 2 of crystallizer 1 via pump 19 and line 21 into centrifuge 13 where the crystals are spun free of mother liquor and removed from the centrifuge and dried. Excess slurry returns to chamber 2 by way of line 23. The mother liquor from centrifuge 13 which contains a fine suspension of magnesium silicate formed by reaction of the soluble magnesium salt with the sodium silicate stabilizer enters mother liquor storage tank 45 by way of line 41 and then is conducted through to filter 17 via line 15 by pump 49 and the magnesium silicate separated by filtration and discarded. The mother liquor from filter 17 enters by way of line 16, mother liquor holding tank 45, and is pumped to slurry loop 9 via line 18 to evaporation chamber 3. A weight of water approximately equivalent to the water in the charge materials is removed by evaporation in evaporation chamber 3 thereby maintaining the system in a steady state. Mother liquor containing sodium carbonate peroxide crystals leaves lower chamber 2 by way of slurry loop 9 and is conducted to evaporation chamber 3 from whence it returns to lower chamber 2. Circulation of the slurry is provided by pump 22. Heat exchanger 26 in slurry loop 9 supplies necessary heat for the evaporation of excess water. Suspended sodium carbonate peroxide fines are removed by conveying a stream from the top of the reaction in lower chamber 2 into evaporation chamber 3 by way of fines heater loop 30 provided with heat exchanger 31 which effects dissolution of fines as the fines slurry passes therethrough.

The process of the invention is illustrated by the following specific examples taken together with the flow diagram in the accompanying drawing.

EXAMPLE 1

Seventy % $H_2O_2$ was reacted with a 30 wt % sodium carbonate solution in a 500 gallon Oslo crystallizer containing 20–25 g/l $H_2O_2$ and 230–240 g/l $Na_2CO_3$. The crystallizer was operated at 30°C, 6.5 hr. residence time, 11.5 pH, and a 30% by wt slurry density. The sodium carbonate solution contained 0.13 g/l of 2 $SiO_2/Na_2O$ sodium silicate and 10–30 ppm Mg. A hydrogen peroxide efficiency of 80 to 85% was obtained at 30°C. The crystals were large, 20% +50 mesh, 70% +100 mesh and readily extractable, retaining only 2–3% moisture on the extractor cake.

EXAMPLE 2

The same operating conditions were used as in Example 1, except 0.27 g/l of 2.0 $SiO_2/Na_2O$ sodium silicate was added to the 30% sodium carbonate solution. A hydrogen peroxide efficiency of 75 to 80% was obtained at 30°C. The crystals were still large, 15% +50 mesh, 65% +100 mesh and readily extractable, retaining only 2-3% moisture on the extractor cake.

EXAMPLE 3

The same operating conditions were used as in Example 1, except no sodium silicate was added to the sodium carbonate feed and the magnesium concentration was raised to 40 ppm. The hydrogen peroxide efficiency varied from 65 to 70%. The resulting crystals were much smaller with only 2% +50 mesh, 30% +100 mesh and not as readily extractable. The extractor cake retained 3-5% moisture.

EXAMPLE 4

The same operating conditions were used as in Example 1, except no sodium silicate was added to the sodium carbonate feed and the magnesium concentration was raised to 120 ppm. A 75 to 80% hydrogen peroxide efficiency was observed. The resulting crystals were small, 2% +50 mesh, 20% +100 mesh and were difficult to extract, retaining 5-10% moisture on the extractor cake. This example shows the decrease in hydrogen peroxide efficiency and small crystal size resulting from high magnesium concentrations in the absence of sodium silicate.

EXAMPLE 5

The same operating conditions were used as in Example 1, except the pH was reduced to 11.2. A hydrogen peroxide efficiency average of 70% was obtained and the crystals were quite large, 33% +50 mesh, 80% +100 mesh. The crystals were readily extractable, retaining only 2-3% moisture on the extractor cake.

EXAMPLE 6

The same operating conditions were used as in Example 1, except the pH was reduced to 10.7, the magnesium level was raised to 300 ppm and the sodium silicate concentration to 2.5 g/l in the sodium carbonate feed solution. The hydrogen peroxide efficiency ranged from 70 to 75% and the crystals were small, 2% +50 mesh, 30% +100 mesh. The build-up of magnesium silicate caused the crystals to become difficult to extract and dewater. The extractor cake retained 20-30% moisture. This demonstrates the effect of high levels of magnesium and silicate in causing small crystal size.

EXAMPLE 7

Seventy percent $H_2O_2$ was reacted with a 30 wt % sodium carbonate solution in a 500 gallon Oslo crystallizer containing 40 g/l $H_2O_2$ and 160 g/l sodium carbonate. The crystallizer was operated at 30°C, 6.5 hr. residence time, 11.5 pH and 30% by wt slurry density. The sodium carbonate solution contained 0.13 g/l of 2 $SiO_2/Na_2O$ sodium silicate and 10 to 30 ppm Mg. A hydrogen peroxide efficiency of 75 to 80% was observed. The crystals were large 20% +50 mesh, 70% +100 mesh and readily extractable, retaining only 2-3% moisture on the extractor cake. This example shows the decrease in hydrogen peroxide efficiency due to the high hydrogen peroxide concentrations in solution.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

What is claimed is:

1. A continuous process for the production of sodium carbonate peroxide comprising;
   a. reacting aqueous feed solutions of hydrogen peroxide and sodium carbonate in essentially stoichiometric amounts in crystallization zone operated in the region of the phase diagram wherein the hydrogen peroxide concentration is about 1.5 to 4.0% or 17 to 50 g per l, and the sodium carbonate is about 12 to 20% or from about 150 g to 250 g per l, thereby making for a molar ratio of hydrogen peroxide to sodium carbonate from about 0.2 to about 0.7, at a pH from about 11.2 to about 11.7, at a temperature of from about 25°C to about 35°C, at a residence time of from about 5 hours to about 15 hours in the presence of about 10 to 70 ppm Mg as magnesium silicate, and about 0.005 to 0.5 g per l sodium silicate;
   b. removing the so-formed crystalline slurry of sodium carbonate peroxide from the crystallization zone;
   c. filtering the slurry;
   d. drying the sodium carbonate peroxide product;
   e. returning the mother liquor to the crystallizer and
   f. evaporating under vacuum excess water from the system while continuously introducing fresh hydrogen peroxide and sodium carbonate solution.

2. The process according to claim 1 wherein the aqueous hydrogen peroxide feed solution contains 50 - 70% hydrogen peroxide.

3. The process according to claim 1 wherein the sodium carbonate feed solution is a saturated solution.

4. The process according to claim 1 wherein magnesium silicate formed from the soluble magnesium salt and sodium silicate is periodically removed from the system.

5. The process according to claim 1 wherein the soluble magnesium salt is magnesium sulfate.

6. The process according to claim 1 wherein the hydrogen peroxide concentration is about 2% in the crystallization zone.

7. The process according to claim 1 wherein the sodium carbonate concentration is about 18% in the crystallization zone.

* * * * *